United States Patent
Spencer, IV

(10) Patent No.: US 12,348,412 B2
(45) Date of Patent: *Jul. 1, 2025

(54) SCALABLE CORE AND EDGE NETWORK ROUTER

(71) Applicant: AT&T Intellectual Property I, L.P., Atlanta, GA (US)

(72) Inventor: Thomas Spencer, IV, Morganville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/628,936

(22) Filed: Apr. 8, 2024

(65) Prior Publication Data

US 2024/0259297 A1   Aug. 1, 2024

Related U.S. Application Data

(63) Continuation of application No. 17/900,943, filed on Sep. 1, 2022, now Pat. No. 11,979,313.

(51) Int. Cl.
*H04L 45/24* (2022.01)
*H04L 45/00* (2022.01)
*H04L 45/42* (2022.01)

(52) U.S. Cl.
CPC .............. *H04L 45/24* (2013.01); *H04L 45/42* (2013.01); *H04L 45/566* (2013.01)

(58) Field of Classification Search
CPC ........ H04L 45/24; H04L 45/42; H04L 45/566
See application file for complete search history.

(56) References Cited

U.S. PATENT DOCUMENTS 8,089,895 B1 * 1/2012 Mackie ............... H04L 43/18
                                                          370/252
10,291,521 B1   5/2019 Godbole et al.
(Continued)

OTHER PUBLICATIONS

Janardhan, Santosh, "More details about the October 4 outage", https://engineering.fb.com/2021/10/05/networking-traffic/outage-details/, Oct. 5, 2021, 5 pgs.
(Continued)

*Primary Examiner* — Jeong S Park
(74) *Attorney, Agent, or Firm* — Guntin & Gust, PLC; Miyoung Shin

(57) ABSTRACT

Aspects of the subject disclosure may include, for example, a routing device in a network, the routing device including an ingress/egress linecard; another linecard; a fabric; a processing system including a processor; and a memory that stores executable instructions that, when executed by the processing system, facilitate performance of operations of maintaining a forwarding information base (FIB) for routes through the routing device; moving low-volume routes of the FIB to the another linecard; and moving high-volume routes of the FIB to the ingress/egress linecard, wherein the ingress/egress linecard looks up a route of an incoming data packet, determines whether the incoming data packet bears a high-volume route prefix, forwards the incoming data packet bearing the high-volume route prefix through the fabric and out of the routing device, and sends the incoming data packet bearing a low-volume route prefix through the fabric to the another linecard, and wherein the another linecard forwards the incoming data packet received from the ingress/egress linecard out of the routing device. Other embodiments are disclosed.

20 Claims, 10 Drawing Sheets

(56) References Cited

U.S. PATENT DOCUMENTS

| | | | |
|---|---|---|---|
| 11,979,313 B2* | 5/2024 | Spencer, IV | H04L 45/566 |
| 2002/0021667 A1 | 2/2002 | Davis et al. | |
| 2002/0027902 A1 | 3/2002 | Reeve et al. | |
| 2004/0022539 A1 | 2/2004 | Bannister et al. | |
| 2009/0109852 A1 | 4/2009 | Grover et al. | |
| 2010/0215047 A1* | 8/2010 | Filsfils | H04L 49/3009 |
| | | | 370/395.31 |
| 2013/0336332 A1 | 12/2013 | Kwan et al. | |
| 2017/0279709 A1* | 9/2017 | Bonica | H04L 45/54 |
| 2018/0198710 A1* | 7/2018 | Dale | H04L 45/74 |
| 2020/0304427 A1* | 9/2020 | Sandler | H04L 12/00 |
| 2021/0092063 A1* | 3/2021 | Ramaprasad | H04L 45/24 |
| 2021/0273891 A1* | 9/2021 | Labonte | H04L 49/252 |
| 2022/0014464 A1* | 1/2022 | Boutros | H04L 67/12 |
| 2023/0026183 A1* | 1/2023 | Manoharan | G06F 9/505 |
| 2024/0080258 A1 | 3/2024 | Spencer | |
| 2024/0080278 A1 | 3/2024 | Spencer | |

OTHER PUBLICATIONS

"Non-Final Office Action received for U.S. Appl. No. 17/900,938", Sep. 28, 2024, 30 Pages.

* cited by examiner

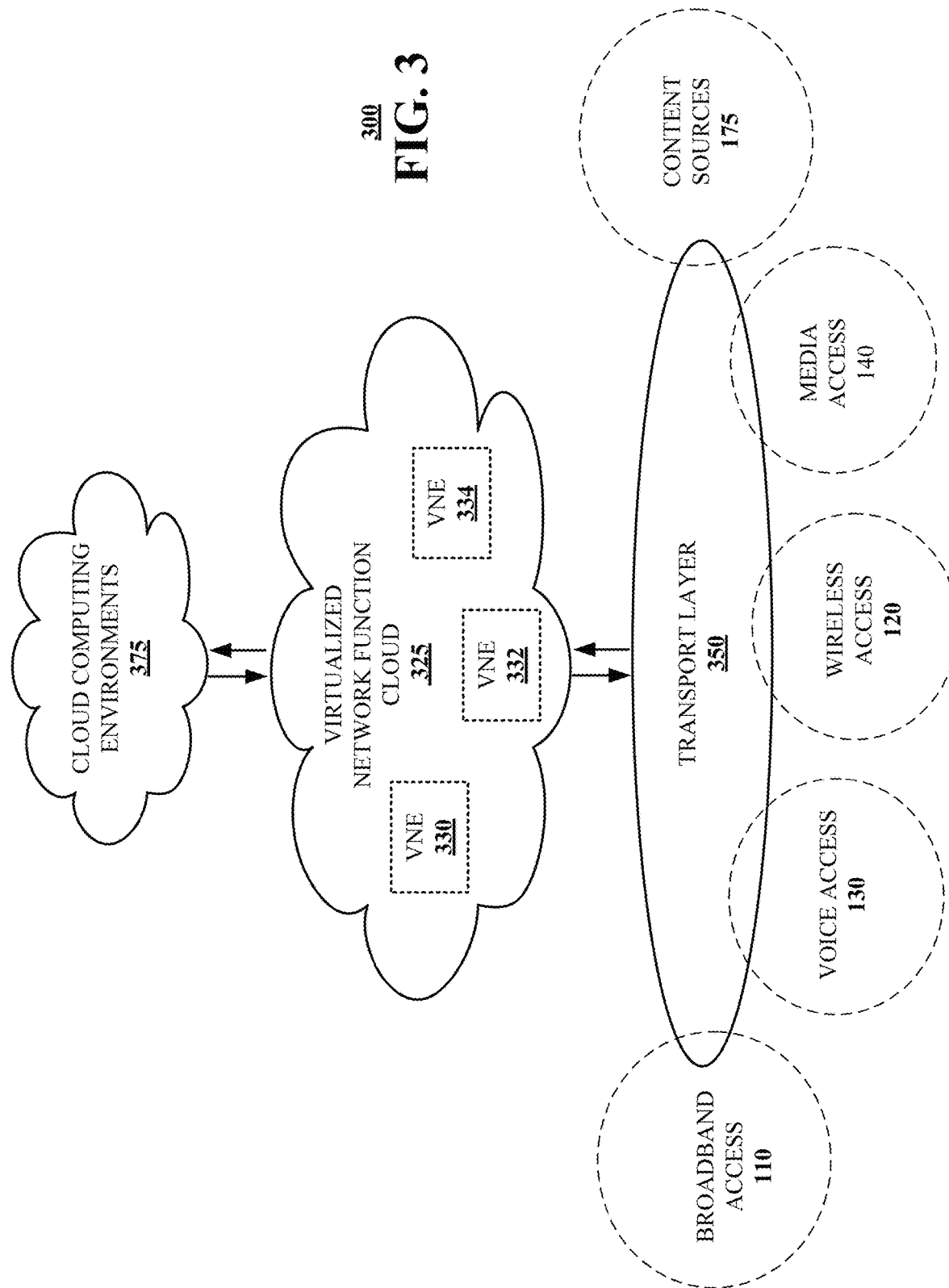

SCALABLE CORE AND EDGE NETWORK ROUTER

CROSS REFERENCE TO RELATED APPLICATIONS

The subject patent application is a continuation of, and claims priority to, U.S. patent application Ser. No. 17/900,943, filed Sep. 1, 2022, and entitled "SCALABLE CORE AND EDGE NETWORK ROUTER," the entirety of which priority application is hereby expressly incorporated by reference herein.

FIELD OF THE DISCLOSURE

The subject disclosure relates to a carrier-grade, scalable core and edge network router.

BACKGROUND

Unlike routers used within a home or small business local area network (LAN), state-of-the-art, carrier-grade, core routers are used by large corporations and businesses that transmit substantial numbers of data packets within their network. Core routers operate at the "core" of a network and often use Multi-Protocol Label Switching (MPLS) to route traffic through the core network. Core routers also communicate exclusively with other core and edge routers, and do not communicate with external networks.

While a core router exclusively manages data traffic within a large-scale network, an edge router communicates with both core routers and external networks. Edge routers are designed to provide services at the "edge" of a core network. Often, such routers use Border Gateway Protocol (BGP) to send and receive data from other LANs and wide-area networks (WANs). Modern, carrier-grade routers can generally support up to two million (2M) routes.

BRIEF DESCRIPTION OF THE DRAWINGS

Reference will now be made to the accompanying drawings, which are not necessarily drawn to scale, and wherein:

FIG. 3 is a block diagram illustrating an example, non-limiting embodiment of a virtualized communication network in accordance with various aspects described herein.

DETAILED DESCRIPTION

Figure 1:
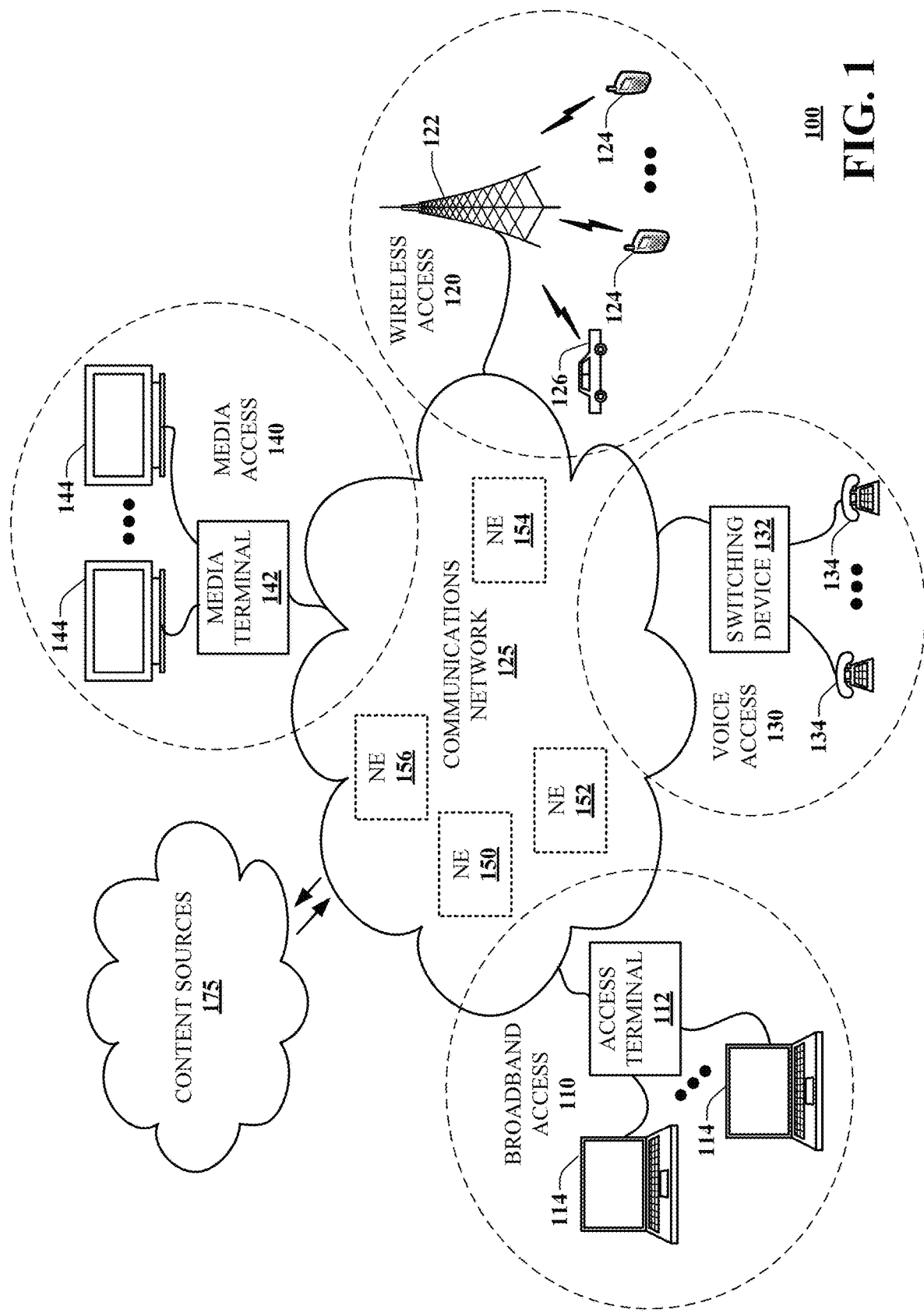
FIG. 1 is a block diagram illustrating an exemplary, non-limiting embodiment of a communications network in accordance with various aspects described herein.

The subject disclosure describes, among other things, illustrative embodiments for a carrier-grade, scalable router, also known as a distributed, disaggregated cluster (DDC). Each DDC is a core or edge router comprising one or more linecards. A linecard is a printed circuit board that provides a transmitting/receiving port for a carrier's WAN. Linecards plug into telephone company switches and high-end routers, which have a modular chassis that accepts a range of cards. Depending upon the physical configuration, each DDC is capable of routing hundreds of terabits per second ($10^{12}$ bits/second or Tbps) worth of data into, out of, or through a core network, and is scalable for routing even larger data rates (i.e., exabits per second). Other embodiments are described in the subject disclosure.

One or more aspects of the subject disclosure include a routing device in a network, the routing device including an ingress/egress linecard; another linecard; a fabric; a processing system including a processor; and a memory that stores executable instructions that, when executed by the processing system, facilitate performance of operations of maintaining a forwarding information base (FIB) for routes through the routing device; moving low-volume routes of the FIB to the another linecard; and moving high-volume routes of the FIB to the ingress/egress linecard, wherein the ingress/egress linecard looks up a route of an incoming data packet, determines whether the incoming data packet bears a high-volume route prefix, forwards the incoming data packet bearing the high-volume route prefix through the fabric and out of the routing device, and sends the incoming data packet bearing a low-volume route prefix through the fabric to the another linecard, and wherein the another linecard forwards the incoming data packet received from the ingress/egress linecard out of the routing device.

One or more aspects of the subject disclosure include a non-transitory, machine-readable medium with executable instructions that, when executed by a processing system including a processor, facilitate performance of operations of: maintaining a forwarding information base (FIB) for routes in a network through a routing device cluster having a fabric, a first set of distributed chassis packet forwarders (DCPs) supporting external service interfaces and a second set of DCPs; moving high-volume routes of the FIB to the first set of DCPs; and moving low-volume routes of the FIB to the second set of DCPs, wherein the first set of DCPs looks up a route of an incoming data packet, determines whether the incoming data packet bears a high-volume route, forwards the incoming data packet bearing the high-volume route through the fabric and out of the routing device cluster, and sends the incoming data packet bearing a low-volume route through the fabric to the second set of DCPs, and wherein the second set of DCPs forwards the incoming data packet received from the first set of DCPs out of the routing device cluster.

One or more aspects of the subject disclosure include a method of storing, by a processing system including a processor, a forwarding information base (FIB) for routes in a network through a routing device having a fabric, a first set of distributed chassis packet forwarders (DCPs) that support external service interfaces and a second set of DCPs; determining, by the processing system, which routes in the FIB have high-volume route prefixes; copying, by the processing system, the high-volume route prefixes to the first set of DCPs; and copying, by the processing system, low-volume route prefixes of the FIB to the second set of DCPs.

Referring now to FIG. 1, a block diagram is shown illustrating an example, non-limiting embodiment of a system 100 in accordance with various aspects described herein. For example, system 100 can facilitate in whole or in part maintaining a routing table for routes in a network through a routing device having a fabric, a first set of distributed chassis packet forwarders (DCPs) that support external service interfaces and a second set of distributed chassis packet forwarders; determining which routes in the routing table have high-volume route prefixes; copying the high-volume route prefixes to the first set of DCPs; and copying low-volume route prefixes of the routing table to the second set of DCPs. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VoIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VoIP gateway or other gateway device and/or other switching device. The telephony devices 134 can include traditional telephones (with or without a terminal adapter), VoIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, core routers, edge devices, switches and other network nodes for routing and controlling communications traffic over wired, optical and wireless links as part of the Internet and other public networks as well as one or more private networks, for managing subscriber access, for billing and network management and for supporting other network functions.

Existing network operating system (NOS) designs for carrier-grade, core and edge routers program every route into each linecard. Consequently, once the maximum size of a full routing table is reached in the most limiting linecard, the router will no longer have scalable growth for additional routes. Furthermore, since the full routing table resides in the memory of each linecard, the routing table consumes critical resources that could be used for other features.

The present disclosure provides a NOS for splitting the full routing table in a DDC so that additional scaling and features may be provided by the DDC, resulting in larger clusters with more route handling. In an embodiment, the DDC splits storage and handling of routes based on utilization, rather than locality. In an embodiment, the DDC uses recirculation to manage low-volume routes. In addition, each DDC is locally managed, which does not alter network control plane functions, forwarding behaviors, or network topology.

Figure 2A:
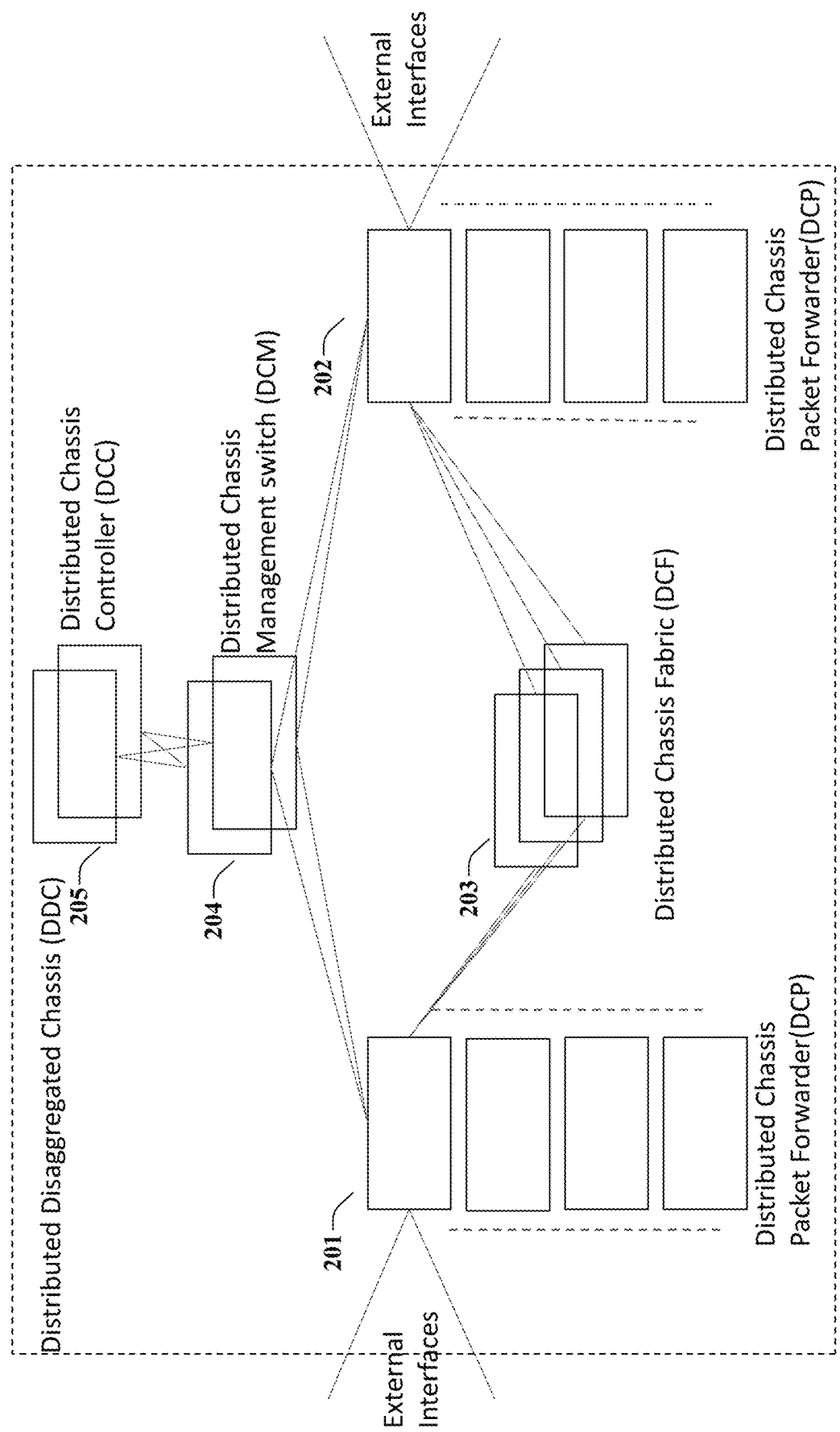
FIG. 2A is a block diagram illustrating an example, non-limiting embodiment of a distributed, disaggregated cluster (DDC) routing device functioning within the communication network of FIG. 1 in accordance with various aspects described herein.

FIG. 2A is a block diagram illustrating an example, non-limiting embodiment of a distributed, disaggregated cluster (DDC) routing device functioning within the communication network of FIG. 1 in accordance with various aspects described herein. As shown in FIG. 2A, DDC 200 comprises a first set of one or plural distributed chassis packet forwarders (DCP 201), a second set of one or plural distributed chassis packet forwarders (DCP 202), one or plural distributed chassis fabric (DCF 203, f/k/a the "fabric"), two or more distributed chassis management switches (DCM 204) and two or more distributed chassis controllers (DCC 205). Each DCP 201, 202 in DDC 200 is connected to every DCF 203 and every DCM 204 in the DDC 200 via one or more links.

DCC 205 is a computer that executes the software that controls the operation of DDC 200. DCC 205 processes connectivity to an external operations, administration and maintenance (OA&M) platform, controls and configures all elements of DDC 200, and provides a centralized control plane that makes DDC 200 appear as a single network element in the network. Each DCM 204 is a local area network switch that provides connectivity between the components in DDC 200 for the purposes of: element control (i.e., managing the health (temperature, voltage levels, fan speed, etc.) and state (e.g., running/BIOS access/booting/halted/powered down/etc.) of the DCP), configuration (e.g., setting of operational parameters), signaling between DCPs (i.e., events that occur on a particular DCP that should be shared with other DCPs in a cluster, e.g., loss of signal on an interface port, etc.), and operation of the control plane of DDC 200.

Each DCF 203 is a high-capacity network switch element that provides data plane forwarding between DCP 201 and DCP 202. DCF 203 is not aware of the data payload and only provides transport between elements of the cluster.

Each DCP 201, 202 is a network forwarding element that provides services delivered by DDC 200. Each DCP 201, 202 may be connected via external interfaces to other network equipment. Packet forwarding service functions are programmed into DCPs 201, 202 by DCC 205. A data packet received by a DCP 201, 202 from an external interface may be forwarded out via another interface on the DCP or forwarded to another DCP across DCF 203. A data packet received by a DCP 201, 202 from DCF 203 may be forwarded out an external interface or sent back to DCF 203 to another DCP.

A set (2 or more) of DCPs is designated as a lookup engine for selected routes. This set of DCPs either does not have any external interfaces (i.e., a route scale DCP), or only external interfaces of a restricted type (i.e., an uplink DCP). The standard process of a DCP receiving a packet, determining the egress interface, then sending the packet to the destination DCP (which might be itself) is enhanced to include sending a packet to a route scale DCP or uplink DCP to complete the forwarding decision.

In an embodiment, the standard NOS design of loading all forwarding information on every linecard is altered. DCPs that support services on external interfaces are programmed with routes learned locally on the cluster. High-volume routes learned via the routing control plane of the carrier network DCPs that have been designated as a route scale DCP are programed with low-volume routes learned via the routing control plane of the carrier network. DCPs that have been designated as an uplink DCP are programmed with routes learned locally on this cluster and low-volume routes learned via the routing control plane of the carrier network.

Figure 2B:
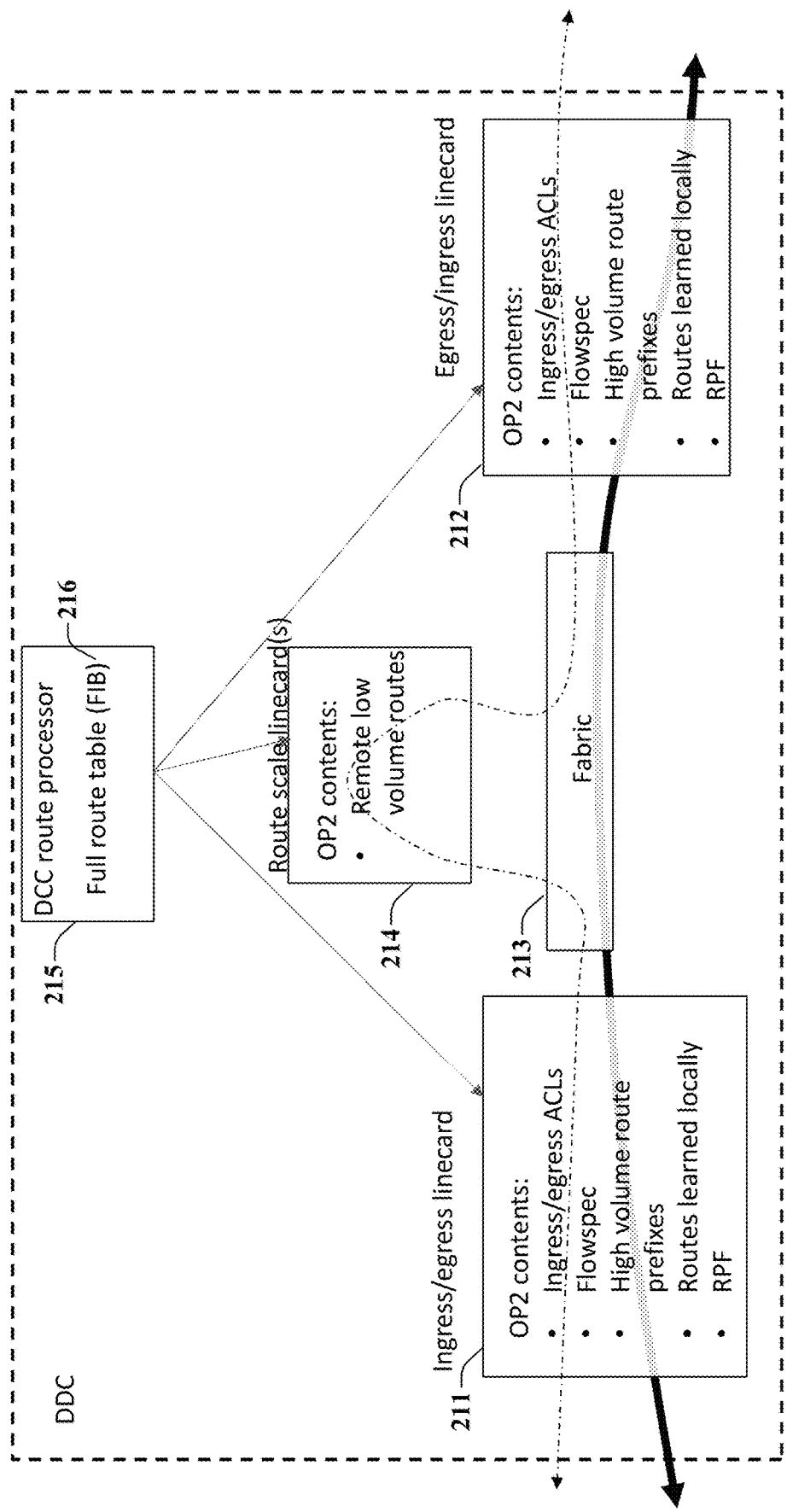
FIG. 2B is a block diagram illustrating an example, non-limiting embodiment of an embodiment of a DDC functioning within the communication network of FIG. 1 in accordance with various aspects described herein.

FIG. 2B is a block diagram illustrating an example, non-limiting embodiment of an embodiment of a DDC functioning within the communication network of FIG. 1 in accordance with various aspects described herein. As shown in FIG. 2B, DDC 210 comprises an ingress/egress linecard 211, an egress/ingress linecard 212, a fabric 213, a route scale linecard 214 and a DCC 215 route processor including a forwarding information base (FIB 216), f/k/a "full route table." In an embodiment, DDC 210 may be used as an edge router in a carrier's data network.

One of the key components of virtually any layer 2 or layer 3 switch is the Ternary Content Addressable Memory, or TCAM, an expensive component typically scarce as a resource on many switching platforms. A TCAM (OP2) of ingress/egress linecard 211 and egress/ingress linecard 212 comprises access control lists (ACLs), FlowSpec (which is defined in RFC 5575 that defines a Multi-Protocol BGP Extension MP-BGP), high-volume route prefixes and reverse-path forwarding (RPF) information. Both linecards learn routes locally.

In contrast, TCAM (OP2) of route scale linecard 214 merely comprises remote, low-volume routes. Route scale linecard 214 is plugged into fabric 213, and thus does not perform interface handling operations. However, a full set of resources (internal and external TCAM) is available for route lookups.

In an embodiment, edge router traffic follows an "80/20" rule, such that 80% of the traffic (i.e., the so-called high-volume routes) uses only 20% of the routes, whereas the remaining 80% of the routes are of the so-called low-volume variety. Hence, the DDC uses a "helper" linecard that makes forwarding decisions on a substantial portion of the majority of the routing table (i.e., about 80% of the routing information) that sees extraordinarily little traffic.

In an embodiment, when a data packet arrives at the ingress/egress linecard 211, the ingress/egress linecard 211 examines the data packet to determine whether the data packet specifies a high-volume route or not. If there is no match, ingress/egress linecard 211 sends the data packet to the route scale linecard 214 that stores the remaining, low-volume routes in its table. In an embodiment, the route scale linecard 214 is configured to route data packets into and out of a core part of the network by only performing route lookups, but performs no other routing functions (i.e., no RPF checks, no FlowSpec, etc.). In this fashion, the storage memory of the ingress/egress linecard 211 saved by storing the remainder of the routing table on the route scale linecard 214. Hence, the storage memory may be used for other features and extends the scaling abilities of DDC 200. Furthermore, since the route scale linecard 214 does not need to have full packet forwarding performance or features, the use of this technique has a limited routing performance impact on DDC 210.

In an embodiment, DCC 215 can derive whether a route is a high-volume route or not using NetFlow sampled statistics. NetFlow is an existing technology that provides statistics on packets flowing through a router. NetFlow acquires IP operational data from IP networks. NetFlow provides data to support network and security monitoring, network planning, traffic analysis, and IP accounting. In an embodiment, DCC 215 uses a load on the route scale linecard 214 to determine if a route should be moved to ingress/egress linecard 211 or not. In an embodiment, egress/ingress linecard 212 performs the same functions as ingress/egress linecard 211, but in the opposite data flow direction, as illustrated in FIG. 2B. Furthermore, the architecture illustrated in FIG. 2B resurrects an opportunity to have virtual private networking (VPN) through the same edge router.

In an embodiment, splitting the routing tables as described above provides significant improvements in the ability of DDC 210 to scale. For example, dedicated route scale linecards can add four million (4M) Internet Protocol version 4 (IPv4) and 2M IPv6 routes per set. In addition, designated uplink linecards (described in more detail below in connection with FIG. 2C) can add 2M IPv4 and 1M IPv6 routes per set. Further, the routes are address family independent—can apply to IPv4, IPv6, VPN IPv4 or VPN IPv6. Furthermore, the two options can be combined. For example, one route scale linecard set plus 2 uplink linecard sets are capable of providing 9.5M IPv4 routes and 4.5M IPv6 routes on a medium cluster.

In an embodiment, splitting the routing tables as described above provides significant improvements in the ability of DDC 210 to provide features. For example, three to four times more space is available for ACLs. 1M prefixes across DDC 210 would also be possible, at 100K per linecard. FlowSpec can be reorganized, growing to over 100K entries. Furthermore, FlowSpec entries would be co-resident with destination prefixes.

It should be noted that splitting the FIB 216 is different from adding a "helper" router. A helper router requires additional network capacity deployment, impacts the routing architecture, and requires external synchronization across routers. Furthermore, maintaining the details of the helper router impacts operations. Lastly, adding a helper router significantly increases the chance of blackholing traffic. See, e.g., engineering.fb.com/2021/10/05/networking-traffic/outage-details/, which is incorporated by reference herein. Splitting the FIB 216 can be implemented locally in a router, which does not impact the overall network architecture, hence the routing architecture remains the same. There is no external synchronization required at all. The details of how the FIB 216 is split can be hidden from a maintenance point of view. Finally, since the effect is local to the router, and is implemented by the network operating system (NOS), no network blackholing will occur.

Figure 2C:
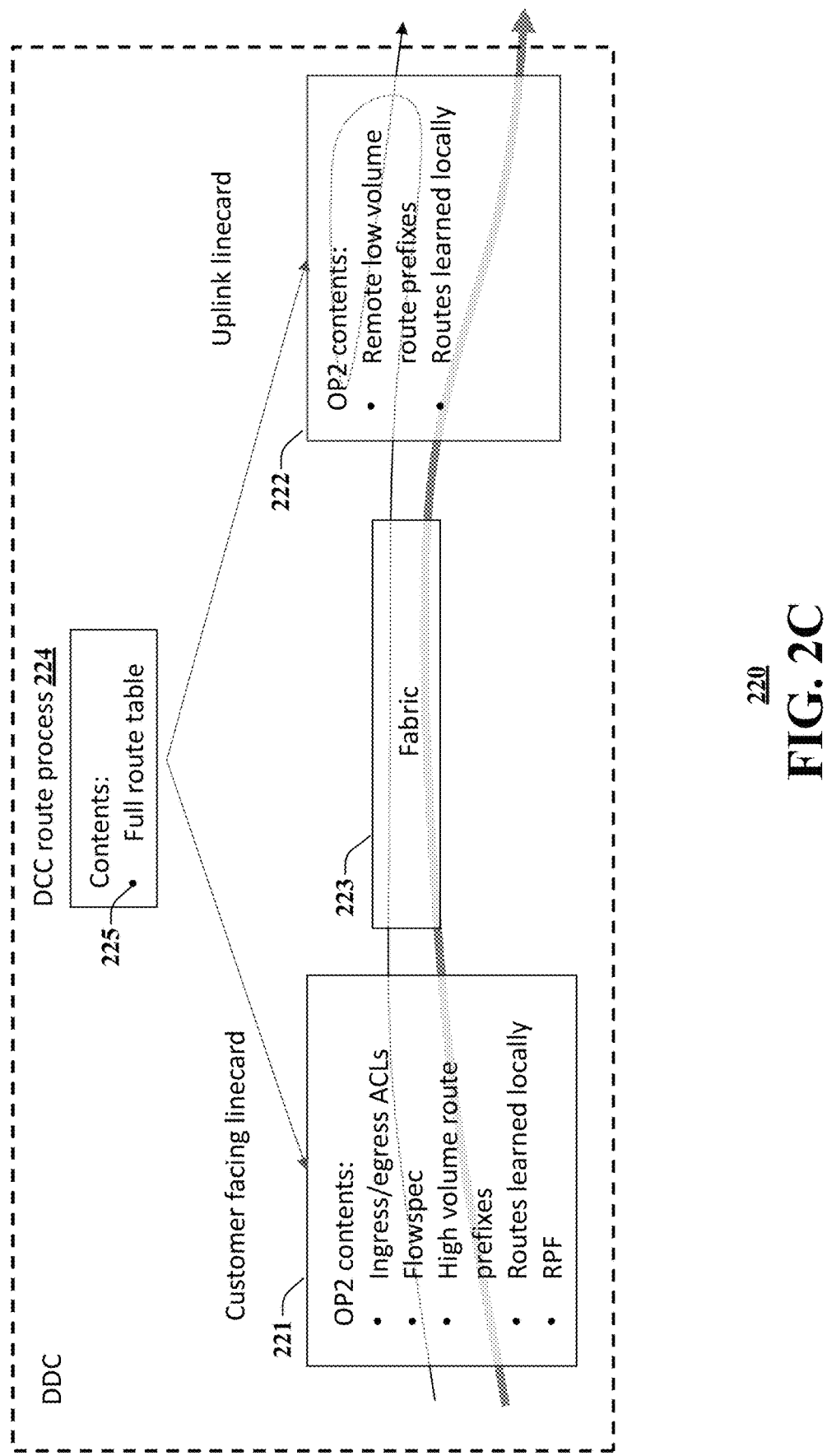
FIG. 2C is a block diagram illustrating an example, non-limiting embodiment of another embodiment of a DDC functioning within the communication network of FIG. 1 in accordance with various aspects described herein.

FIG. 2C is a block diagram illustrating an example, non-limiting embodiment of another embodiment of a DDC functioning within the communication network of FIG. 1 in accordance with various aspects described herein. As shown in FIG. 2C, DDC 220 comprises a customer facing linecard 221, an uplink linecard 222, a fabric 223 and a DCC route processor 224 including a forwarding information base (FIB 225). In an embodiment, DDC 220 may only be used as an edge router interfacing with a carrier's core network.

TCAM (OP2) of customer facing linecard 221 comprises ingress and egress ACLs, FlowSpec, high-volume route prefixes and RPF entries. In contrast, TCAM (OP2) of uplink linecard 222 comprises remote, low-volume route prefixes. External TCAM is used by uplink linecard 222 for customer facing features such as ACL space, RPF entries, and some FlowSpec space. Both linecards 221, 222 learn routes locally.

In an embodiment, when incoming data packets arrive at the customer facing linecard 221, the customer facing linecard 221 examines each incoming data packet to determine whether the incoming data packet specifies a high-volume route or not. If there is no match, customer facing linecard 221 sends the incoming data packet to the uplink linecard 222 that stores the remaining, low-volume route prefixes in its table. In an embodiment, the uplink linecard 222 is configured to route data packets into the core part of the network by performing route lookups, but performs no other routing functions (i.e., no RPF checks, no FlowSpec, etc.). In this fashion, the storage memory of the customer facing linecard 221 saved by storing the remainder of the routing table on the uplink linecard 222 may be used for other features. Also, the saved storage memory extends the scaling abilities of DDC 220. Furthermore, since the uplink linecard 222 does not need to have full packet forwarding performance or features, the use of this technique has a limited routing performance impact on DDC 220.

In an embodiment, if the forwarding topology of the DDC 220 was constrained to only support uplinks on a given pair of uplink linecards, the designated uplink linecards could perform the function of a route scale linecard. Locally learned routes (i.e., routes that were not learned from route reflectors [what are "route reflectors?"]) are the only routes needed in the forwarding table of uplink linecard 222 to deliver packets from the customer. High-volume remote routes can be excluded, as those routes would be in the customer facing linecard 221. Low-volume remote routes would be included in the forwarding table of the uplink linecard 222. Only low-volume route traffic would be recirculated by the uplink linecard 222, as illustrated in FIG. 2C. Also, the RPF check database size would be nearly zero, as there would be no RPF check on incoming packets from the uplink linecard 222. However, FlowSpec would be needed on uplink linecard 222 (with rules only when a local router learns the destination).

In an embodiment, a DDC that uses an uplink linecard reduces the maximum scaling of routes, but at a reduced cost. An increased scaling of 1.5-2× is estimated to be achievable with an uplink linecard, whereas using dedicated route forwarders provide an increase scaling of 3-4×. Hence, uplink linecards cannot be used for customer connections. Some limited forwarding impact could be seen on uplink linecards (mostly taken from available headroom due to having only 4 Tb/sec of interfaces A dedicated processor card can be different in terms of pipeline setup or even what chip is used for forwarding. Additionally, forwarding performance impact is easily modeled.

Figure 2D:
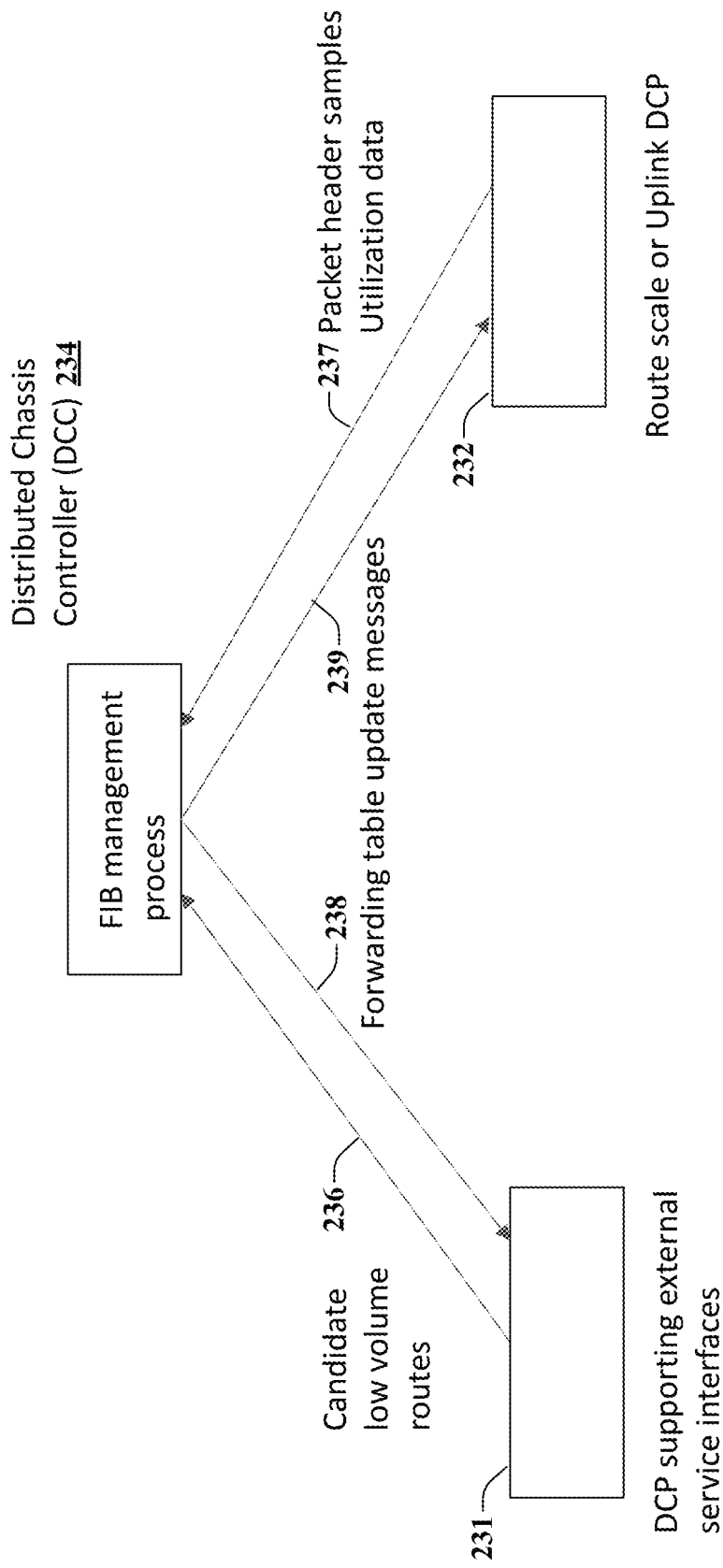
FIG. 2D depicts an illustrative embodiment of a routing table management process in accordance with various aspects described herein.

FIG. 2D depicts an illustrative embodiment of a FIB management process 230 in accordance with various aspects described herein. As shown in FIG. 2D, DCC 234 is responsible for managing route prefixes and splitting the FIB to distribute high-volume routes to DCP 231 supporting external service interfaces and to distribute low-volume routes to route scale or uplink DCP 232. As DCC 234 learns routes from the carrier control plane (usually BGP), DCC 234 programs those routes into the low-volume forwarding tables on the set of DCP 232 selected for that chunk of routes. In an embodiment, when an offered load on DCP 232 is above a set threshold (1 Tbps is proposed as an initial threshold), DCP 232 sends messages 237 that: (1) report utilization data for the low-volume traffic on a configured interval (e.g., 1-120 seconds) to DCC 234 FIB management process; and (2) provide packet header samples (at a configurable sample rate) to DCC 234 FIB management process for the low-volume traffic.

In an embodiment, DCC 234 FIB management process creates a usage histogram of the traffic samples, using destination prefixes as a data element tracked, to determine the most active of the low-volume traffic. When the reported utilization from DCP 232 supporting the low-volume routes exceeds a configured threshold (e.g., in Gbps), DCC 234 FIB management process sends a message 238 that updates the forwarding table on the service interface DCP 231 with the routes seen most often in the histogram. DCC 234 FIB management process continues to move routes from the low-volume table to the high-volume table using this decision criterion until the reported utilization drops below a configured threshold. In this fashion, prefixes that have become "busy" are downloaded to DCP 231, until the offered load on DCP 232 drops below a threshold (e.g., 1 Tbps).

DCP 231 supporting external service interfaces collect similar usage data for the high-volume routes programmed on them. When the size of a high-volume route table exceeds a configured threshold, DCP 231 sends a message 236 that reports the least used, low-volume routes to DCC 234 FIB management process. DCC 234 FIB management process sends a message 238 that removes those routes from DCP 231 supporting external service interfaces after sending a message 239 that programs them into the appropriate low-volume route table of DCP 232. In this fashion, prefixes with low-volume traffic over a configured interval (e.g., 24 hours)

will be removed from DCP 231. In an embodiment, DCC 234 stores a prefix list database in persistent storage that survives through reboots for a given DDC router, enabling quick establishment of a working set of prefixes after a restart.

In an embodiment, locally attached routes should always remain on DCP 231. Locally attached routes are routes that support directly connected network segments. Although keeping such routes on DCP 231 is not strictly required, it becomes especially useful during recovery/startup situations. In addition, catch all synthetic routes that direct misses to DCP 232 that supports forwarding contexts should also remain on DCP 231, along with high-volume routes. Routes can exist in both DCP 231 and DCP 232 during tuning operations. Such tuning operations must copy a route from one DCP to another before removing the route from either DCP (i.e., make before break to ensure route continuity).

In an embodiment, a forwarding table split between high-volume and low-volume routes should have at least two route scale linecards in DCP 232. This requirement does not restrict the DDC to a single pair of route scale linecards. Each forwarding context (i.e., virtual resource function or VRF) may point to a different low-volume route scale linecard in DCP 232. A synthetic aggregate route is used to split a single address space across multiple route processors. For example: The aggregate route 0.0.0.0/2 would point to route processor pair #1, aggregate route 128.0.0.0/2 points to route processor pair #2.

Figure 2E:
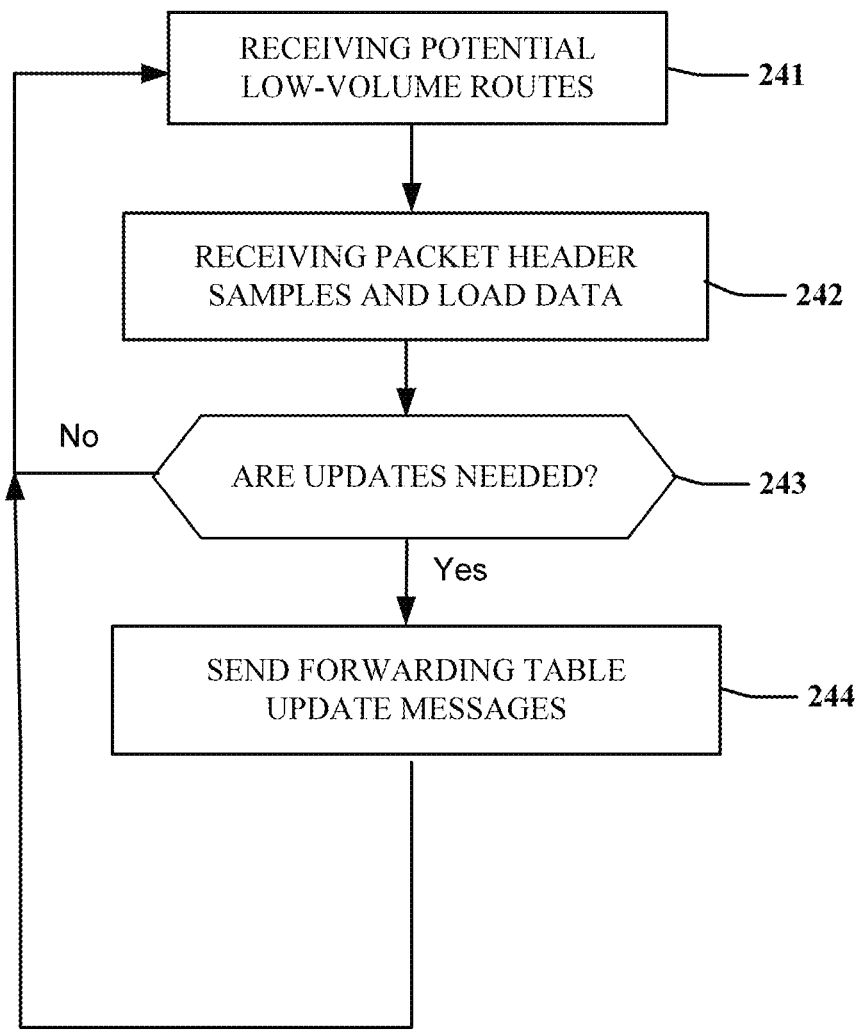
FIG. 2E depicts an illustrative embodiment of a method of maintaining route tables in a router in accordance with various aspects described herein.

FIG. 2E depicts an illustrative embodiment of a method of maintaining route tables in a router in accordance with various aspects described herein. As shown in FIG. 2E, the method 240 begins in step 241 where a routing table management process receives potential low-volume routes identified by a first set of distributed chassis packet forwarders (DCPs). Next in step 242, the routing table management process receives packet header samples and load data from a second set of DCPs.

Next in step 243, the routing table management process determines whether updates are needed. For example, updates might be necessary to reclassify a high-volume route as a potential low-volume route, due to infrequent utilization. In another example, a load on the second set of DCPs might be too high, in which case a number of low-volume routes might need to be reclassified as newly identified high-volume routes. In yet another example, certain low-volume routes may appear frequently in a histogram generated from the packet header samples, thereby necessitating reclassification as high-volume routes.

If updates are not necessary, then the process repeats at step 241. But if updates are needed, the process continues at step 244 where the routing table management process sends forwarding table update messages to the first set of DCPs and the second set of DCPs. In an embodiment, the update messages to move routes are sent in a manner that copies a route from an originating set to the other set, verifies that the copy has been implemented, and then deletes the route from the originating set of DCPs. Then the process repeats at step 241.

While for purposes of simplicity of explanation, the respective processes are shown and described as a series of blocks in FIGS. 2D and 2E, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Referring now to FIG. 3, a block diagram is shown illustrating an example, non-limiting embodiment of a virtualized communication network 300 in accordance with various aspects described herein. In particular a virtualized communication network 300 is presented that can be used to implement some or all of the subsystems and functions of system 100, the subsystems and functions of DDCs 200, 210, 220 and method 240 presented in FIGS. 1, 2A, 2B, 2C, 2D, 2E and 3. For example, virtualized communication network 300 can facilitate in whole or in part maintaining a routing table for routes in a network through a routing device having a fabric, a first set of distributed chassis packet forwarders (DCPs) that support external service interfaces and a second set of distributed chassis packet forwarders; determining which routes in the routing table have high-volume route prefixes; copying the high-volume route prefixes to the first set of DCPs; and copying low-volume route prefixes of the routing table to the second set of DCPs.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements—which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle-boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward substantial amounts of traffic, their workload can be distributed across a number of servers—each of which adds a portion of the capability, and which creates an overall elastic function with higher availability than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
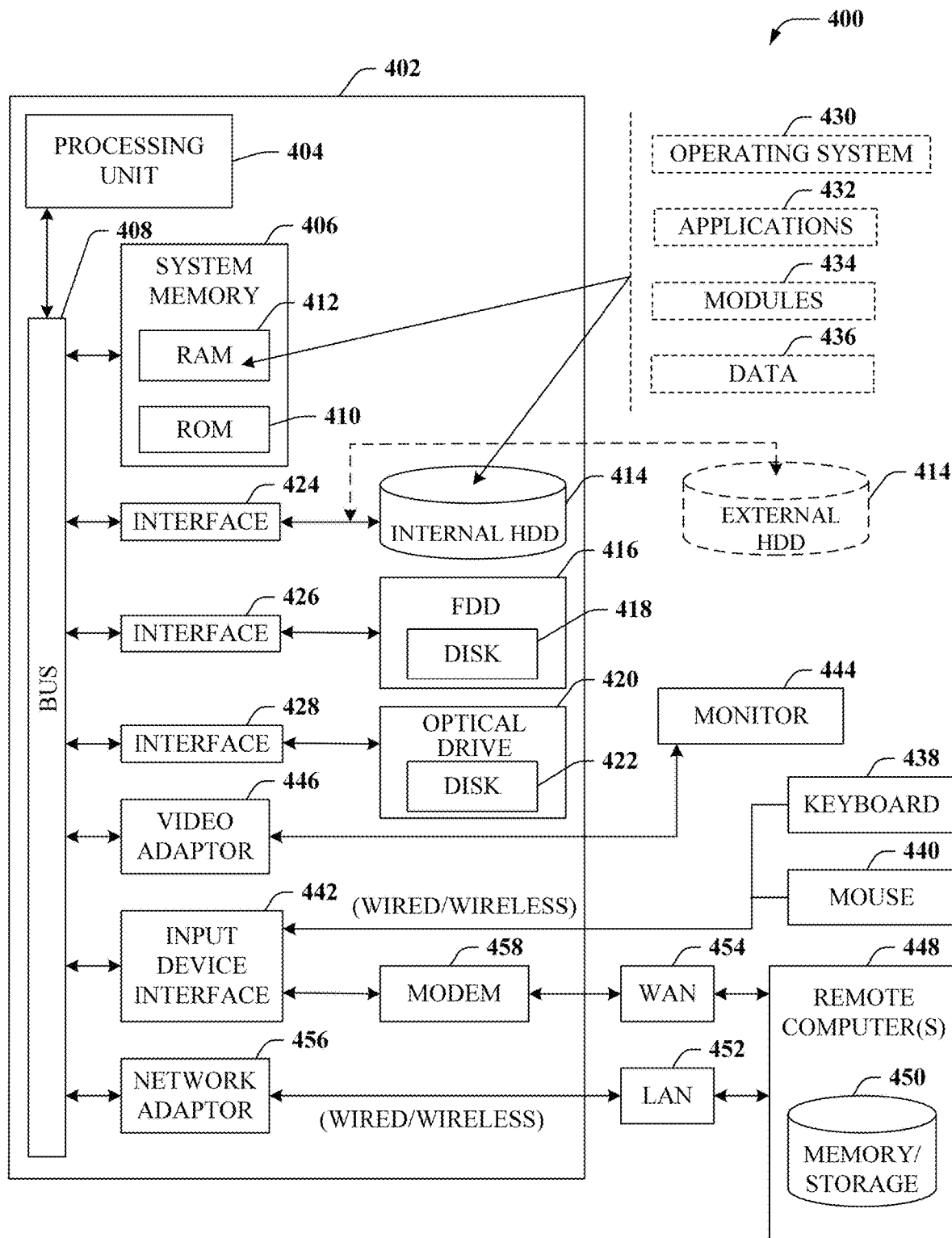
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a computing environment 400 in which the various embodiments of the subject disclosure can be suitably implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part maintaining a routing table for routes in a network through a routing device having a fabric, a first set of distributed chassis packet forwarders (DCPs) that support external service interfaces and a second set of distributed chassis packet forwarders; determining which routes in the routing table have high-volume route prefixes; copying the high-volume route prefixes to the first set of DCPs; and copying low-volume route prefixes of the routing table to the second set of DCPs.

Program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as machine-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody machine-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD 414, e.g., EIDE, SATA), which internal HDD 414 can also be configured for external use in a suitable chassis (not shown), a magnetic floppy disk drive (FDD 416, e.g., to read from or write to a removable diskette 418) and an optical disk drive 420, (e.g., reading a CD-ROM disk 422 or, to read from or write to other high capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN 452) and/or larger networks, e.g., a wide area network (WAN 454). Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
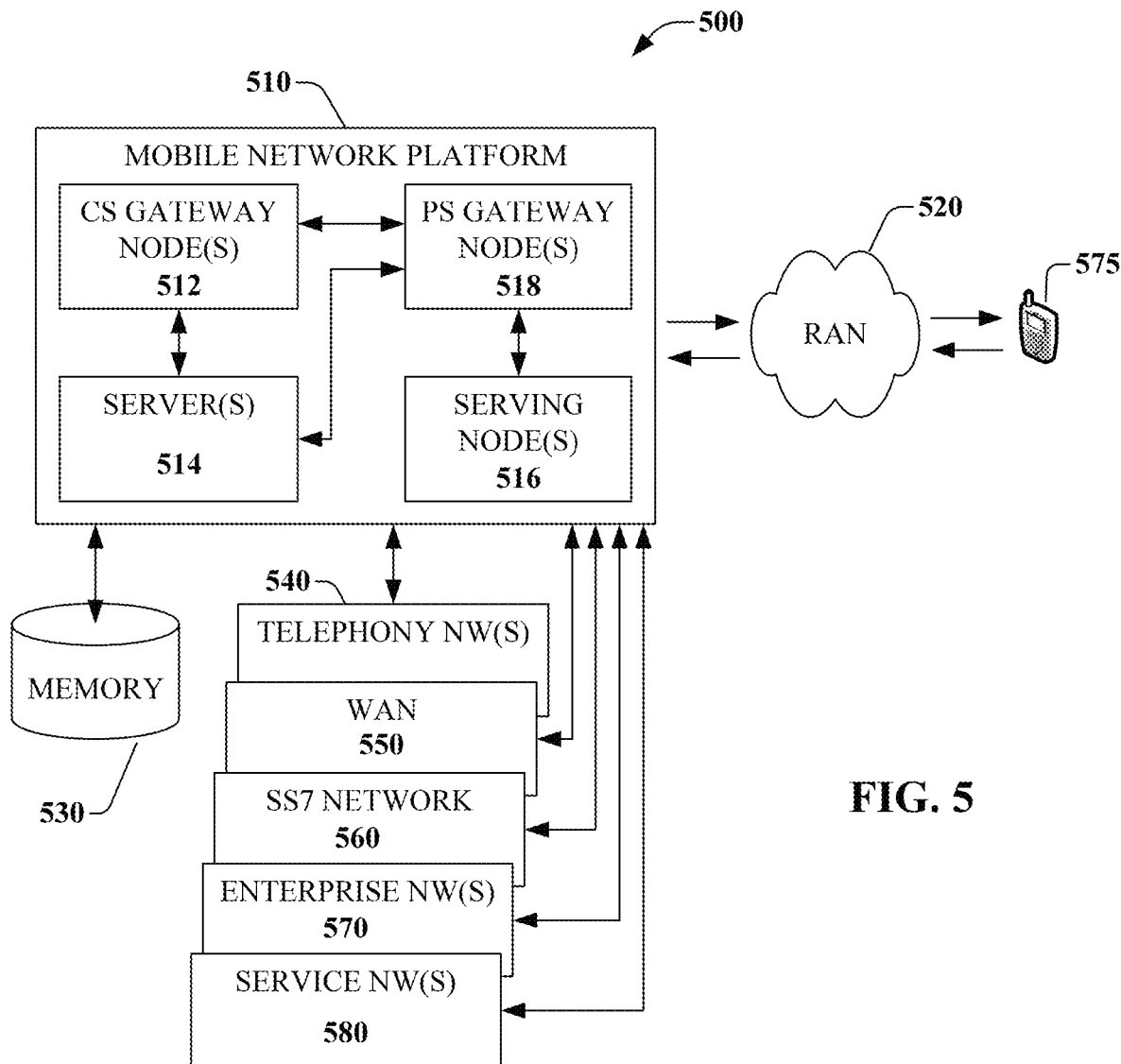
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, mobile network platform 510 can facilitate in whole or in part maintaining a routing table for routes in a network through a routing device having a fabric, a first set of distributed chassis packet forwarders (DCPs) that support external service interfaces and a second set of distributed chassis packet forwarders; determining which routes in the routing table have high-volume route prefixes; copying the high-volume route prefixes to the first set of DCPs; and copying low-volume route prefixes of the routing table to the second set of DCPs. In one or more embodiments, the mobile network platform 510 can generate and receive signals transmitted and received by base stations or access points such as base station or access point 122. Mobile network platform 510 can comprise components, e.g., nodes, gateways, interfaces, servers, or disparate platforms, which facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technology (ies) utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WAN 550), enterprise network(s) 570, and service network(s) 580, which can be embodied in local area network(s) (LANs), can also be interfaced with mobile network platform 510 through PS gateway node(s) 518. It is to be noted that WAN 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(*s*) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in the same manner as described hereinbefore.

In embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Program modules comprise routines, programs, components, data structures, etc. that perform particular tasks and/or implement particular abstract data types.

Figure 6:
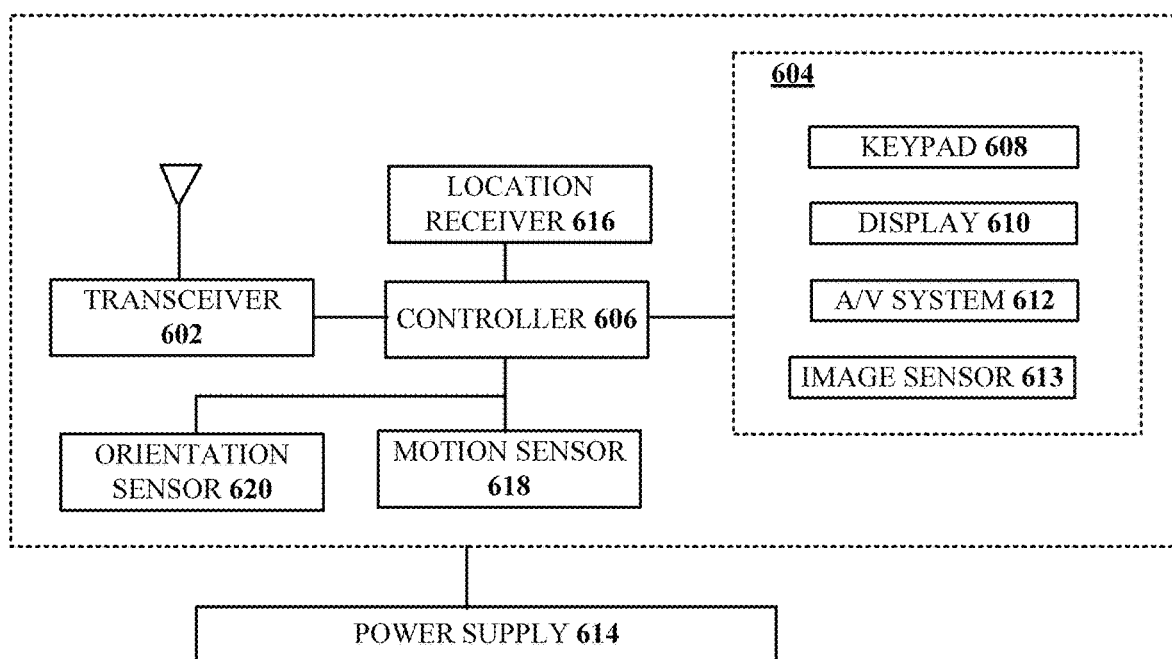
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, computing device 600 can facilitate in whole or in part maintaining a routing table for routes in a network through a routing device having a fabric, a first set of distributed chassis packet forwarders (DCPs) that support external service interfaces and a second set of distributed chassis packet forwarders; determining which routes in the routing table have high-volume route prefixes; copying the high-volume route prefixes to the first set of DCPs; and copying low-volume route prefixes of the routing table to the second set of DCPs.

The communication device 600 can comprise a wireline and/or wireless transceiver (herein transceiver 602), a user interface (UI 604), a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1×, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VoIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human ear) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and east, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for conducting various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)$ =confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or." That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to," "coupled to," and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A routing device in a network, comprising:
    an ingress/egress linecard;
    another linecard;
    a fabric;
    a processing system including a processor; and
    a memory that stores executable instructions that, when executed by the processing system, facilitate performance of operations, the operations comprising:
        splitting a forwarding information base (FIB) for routes locally within the routing device such that the splitting of the FIB is hidden externally to the routing device;
        storing low-volume routes prefixes of the FIB in a forwarding routing table of the another linecard; and
        storing high-volume routes prefixes of the FIB in a routing table of the ingress/egress linecard,
        wherein the ingress/egress linecard looks up a route of an incoming data packet, determines whether the incoming data packet bears a high-volume route prefix, forwards the incoming data packet bearing the high-volume route prefix through the fabric and out of the routing device, and sends the incoming data packet bearing a low-volume route prefix through the fabric to the another linecard.

2. The routing device of claim 1, wherein the another linecard forwards the incoming data packet received from the ingress/egress linecard out of the routing device.

3. The routing device of claim 1, wherein the another linecard comprises an uplink linecard configured to route the incoming data packet into a core part of the network.

4. The routing device of claim 1, wherein the another linecard comprises a route scale linecard configured to route data packets into and out of a core part of the network, wherein moving low-volume routes from the ingress/egress linecard to the route scale linecard frees storage on the ingress/egress linecard to store access control lists.

5. The routing device of claim 4, further comprising an egress/ingress linecard, wherein the route scale linecard forwards the incoming data packet through the fabric to the egress/ingress linecard and out of the routing device.

6. The routing device of claim 5, wherein the operations further comprise copying the high-volume routes prefixes of the FIB to the egress/ingress linecard.

7. The routing device of claim 5, wherein the ingress/egress linecard, the route scale linecard, and the egress/ingress linecard are distributed on a plurality of network elements in the network.

8. The routing device of claim 7, comprising a plurality of ingress/egress linecards, a plurality of egress/ingress linecards and a plurality of route scale linecards.

9. The routing device of claim 8, wherein the processing system comprises a plurality of processors operating in a distributed computing environment.

10. A non-transitory, machine-readable medium, comprising executable instructions that, when executed by a processing system including a processor, facilitate performance of operations, the operations comprising:
    splitting a forwarding information base (FIB) for routes through a routing device cluster in a network, wherein the routing device cluster includes a fabric, a first set of distributed chassis packet forwarders (DCPs) supporting external service interfaces and a second set of DCPs and wherein the splitting the FIB for routes are performed locally within the routing device cluster such that the splitting of the FIB is hidden externally to the routing device cluster;
    storing high-volume routes prefixes of the FIB in a routing table of the first set of DCPs; and
    storing low-volume routes prefixes of the FIB in a forwarding routing table of the second set of DCPs,
    wherein the first set of DCPs looks up a route of an incoming data packet, determines whether the incoming data packet bears a high-volume route prefix, forwards the incoming data packet bearing the high-volume route prefix through the fabric and out of the routing device cluster, and sends the incoming data packet bearing a low-volume route prefix through the fabric to the second set of DCPs; and wherein the first set of DCPs and the second set of DCPs are distributed on a plurality of network elements in the network.

11. The non-transitory, machine-readable medium of claim 10, wherein the second set of DCPs comprises an uplink linecard configured to route data packets into a core part of the network.

12. The non-transitory, machine-readable medium of claim 10, wherein the second set of DCPs comprises a route scale linecard configured to route data packets into and out of a core part of the network.

13. The non-transitory, machine-readable medium of claim 12, wherein the first set of DCPs further comprises an egress/ingress linecard, wherein the route scale linecard forwards the incoming data packet through the fabric to the egress/ingress linecard and out of the routing device cluster.

14. The non-transitory, machine-readable medium of claim 13, wherein the operations further comprise copying the high-volume routes prefixes of the FIB to the egress/ingress linecard.

15. The non-transitory, machine-readable medium of claim 13, wherein the second set of DCPs forwards the incoming data packet received from the first set of DCPs out of the routing device cluster.

16. The non-transitory, machine-readable medium of claim 10, wherein the first set of DCPs further comprises an ingress/egress linecard and the second set of DCPs forwards the incoming data packet received from the ingress/egress linecard of the first set of DCPs out of the routing device cluster.

17. A method, comprising:

splitting, by a processing system including a processor, a forwarding information base (FIB) for routes locally within a routing device in a network such that the splitting of the FIB is hidden externally to the routing device, wherein the routing device includes a fabric, a first set of distributed chassis packet forwarders (DCPs) that support external service interfaces and a second set of DCPs;

determining, by the processing system, which routes in the FIB have high-volume route prefixes;

determining, by the processing system, which routes in the FIB have low-volume route prefixes;

copying, by the processing system, the high-volume route prefixes of the FIB to the first set of DCPs; and copying, by the processing system, the low-volume route prefixes of the FIB to the second set of DCPs, wherein the first set of DCPs looks up a route of an incoming data packet, determines whether the incoming data packet bears a high-volume route prefix, forwards the incoming data packet bearing the high-volume route prefix through the fabric and out of the routing device, and sends the incoming data packet bearing a low-volume route prefix through the fabric to the second set of DCPs, and wherein the second set of DCPs forwards the incoming data packet received from the first set of DCPs out of the routing device.

18. The method of claim 17, wherein the first set of DCPs comprises a plurality of ingress/egress linecards and a plurality of egress/ingress linecards, and wherein the second set of DCPs comprises a plurality of route scale linecards.

19. The method of claim 18, further comprising:

routing, by the processing system, data packets into and out of a core part of the network, via the plurality of route scale linecards; and forwarding, by the processing system, the incoming data packet through the fabric to the plurality of egress/ingress linecards and out of the routing device.

20. The method of claim 17, further comprise identifying, by the processing system, routes stored in the second set of DCPs that have become new high-volume routes and moving the new high-volume routes from the second set of DCPs to the first set of DCPs.

* * * * *